Figure 1:
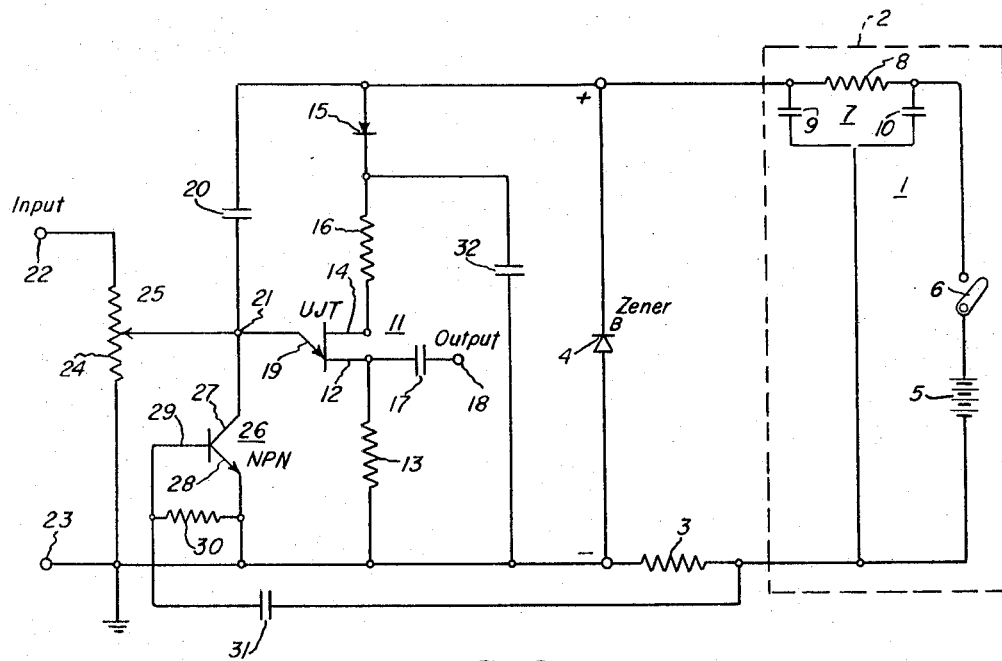

Jan. 24, 1967  R. L. WATTERS  3,300,659

FAIL SAFE OVERVOLTAGE ALARM CIRCUIT

Filed May 18, 1964

Inventor:
Robert L. Watters,
by John F. Ahern
His Attorney.

United States Patent Office 3,300,659
Patented Jan. 24, 1967

3,300,659
FAIL SAFE OVERVOLTAGE ALARM CIRCUIT
Robert L. Watters, Schenectady, N.Y., assignor to General
Electric Company, a corporation of New York
Filed May 18, 1964, Ser. No. 368,016
5 Claims. (Cl. 307—94)

The present invention relates generally to circuits for indicating the departure of a given voltage from a predetermined threshold value and, more particularly, pertains to such circuits having means to prevent an erroneous indication in the event of a power supply failure.

There are an ever increasing number of systems, both large and small, wherein the speed of a human operator is insufficient to adequately protect life and expensive equipment. Thus, automatic protection must be afforded and usually takes the form of a monitor of critical parameters, as pressure, temperature, etc., which provides an output voltage varying in accord with the parameter which is monitored. When this voltage exceeds a predetermined threshold level a voltage sensor circuit detects the departure from normal operating conditions and emits a signal which rapidly triggers to action means which correct the defect or totally de-energizes the system until an operator determines the trouble and normal system operation is again resumed.

In many systems it is highly desirable that operation not be altered in response to an erroneous signal emitted because of a power supply failure in the circuit that energizes the sensor, or sensor and monitor. Thus, while substantially instantaneous response is desired when an actual fault is sensed, it is more acceptable to provide an audible or visual warning when the monitor and sensor circuit is rendered inoperative than to institute erroneous corrective measures upon happening of such event.

For example, it would be unthinkable to completely terminate operation of a large evacuated system upon a mere localized failure in a sensor circuit because expensive apparatus would thereby be rendered unusable for days and even weeks while normal operation was again being restored. However, an actual leak in such a system that precipitated substantial pressure increase demands essentially instantaneous shut-down to save the equipment from destruction. By way of further example, it would be highly disadvantageous in a vehicle radar braking system to have the wheels lock tightly and the vehicle slide to a stop merely because a battery cable jiggled loose. In such event, other warning of the sensor failure, as a flashing light or buzzer, would be far more acceptable.

For use in systems of the general type described above, it would be highly desirable to provide a voltage sensor that emits an output signal in response to departure of a given electrical voltage from a determined threshold magnitude. The sensor is advantageously provided with means to prevent an erroneous output signal in response to failure of the power supply that provides power for the sensor and, preferably, mere fluctuations and small changes in the power supply voltage do not adversely affect operation of the sensor.

Accordingly, it is an object of my invention to provide an improved voltage sensor.

Another object of my invention is to provide a voltage sensor that is fail safe.

Still another object of my invention is to provide a voltage sensor that is substantially instantaneously disabled in the event of a power supply failure.

Yet another object of my invention is to provide a voltage sensor capable of emitting an output signal in response to departure of an input signal from a predetermined magnitude and which sensor performs unimpaired by normal fluctuations in power supply voltage but is prevented from providing an erroneous output signal upon the occurrence of a power supply failure.

Briefly, in one embodiment of my invention I provide a source of electric voltage, impedance means, and a constant voltage regulator all connected in series loop circuit relationship. The voltage of the source, or power supply, is larger than the voltage of the constant voltage regulator with the voltage difference appearing across the impedance means. With such a circuit, upon failure of the source there is a sharp drop in voltage across the impedance means.

A voltage sensor is provided that receives power from the voltage regulator. The sensor has input means adapted to be connected to a voltage to be sensed and output means that provides a signal in response to departures of the sensed voltage from a predetermined magnitude. A controllable electronic device is connected in shunt across the input terminals of the sensor and the control electrode of the device is connected to the junction of the impedance means and the voltage source in such a way that the controllable device is rendered conductive when the voltage source fails. In this way, the input to the sensor is essentially short-circuited and disabled in anticipation of a decline in the voltage from the regulator that powers the sensor, and an erroneous output signal is prevented. By suitably selecting the coupling of the control electrode of the controllable device to the power supply, slow variations and changes in the power supply voltage do not disable or desensitize the sensor.

Figure 2:
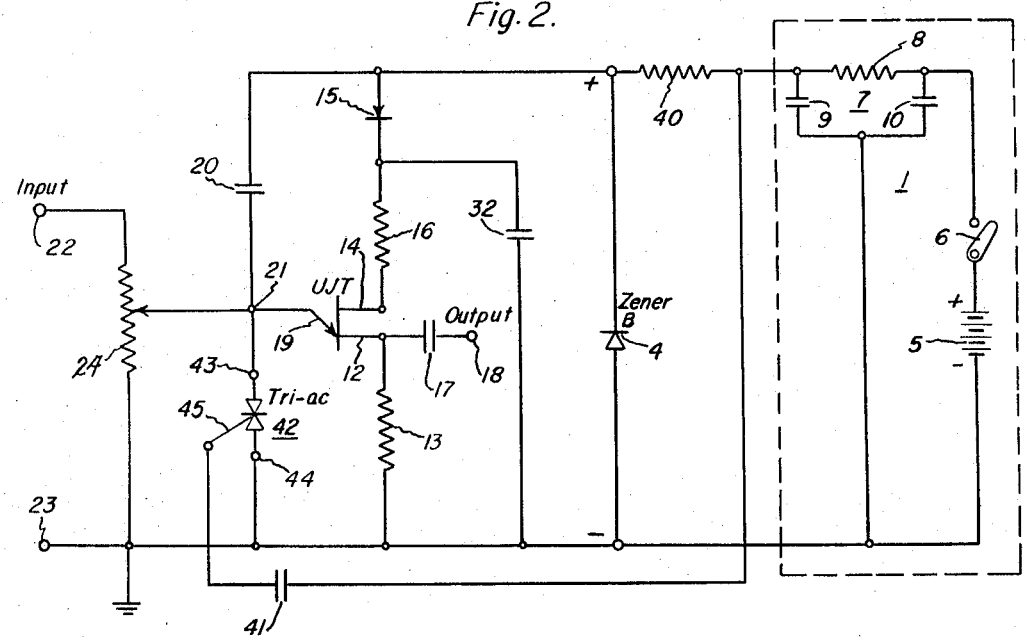

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 1 is a schematic circuit diagram of a sensor circuit in accord with one embodiment of the present invention; and, FIGURE 2 is a schematic circuit diagram of a sensor circuit in accord with another embodiment of the present invention.

The sensor circuit of FIGURE 1 comprises a source 1 of electric voltage generally indicated within the confines of dashed line 2, impedance means 3, and constant voltage regulator means 4 connected in series loop circuit relationship. That is to say, the three afore-mentioned components are connected to form a closed current path.

Source 1 is illustrated schematically as including a battery 5, a switch 6 in series with battery 5, and a "pi" filter 7 shunting battery 5 and switch 6. Filter 7 includes a series resistor 8 and shunt capacitors 9 and 10. It is to be understood that filter 7 is usually not required when source 1 utilizes an actual battery, but is shown because, in most cases, battery 5 is advantageously replaced by a rectifier circuit adapted to be energized from a source of alternating current. In such case, filter 7 serves to remove some of the alternating current component in the unidirectional voltage so provided. In many applications in which the sensor of the present invention is intended to serve, source 1 is remotely located and represented at the sensor situs merely by two electrically conductive wires having a known difference of potential between them.

While switch 6 is appropriately positioned in the circuit of source 1 to serve as means for energizing and de-energizing the source, switch 6 is primarily intended herein to represent a power supply failure when switched to the open circuit condition. Thus, during normal operation of the sensor, switch 6 is to be considered closed and it is the sudden and unexpected opening of switch 6 that is to be guarded against by the means to be described presently.

While constant voltage regulator means 4 is shown as a zener diode, there are a plurality of other essentially equivalent devices that can be used. The essential characteristic is that a substantially constant voltage be exhibited across opposite terminals of the regulator for a given range of current magnitude through the device.

Impedance means 3, that can be advantageously an inductor, or a resistor as shown, is selected to have a resistance value such that voltage regulator means 4 operates in that region of its characteristic wherein the constant voltage is exhibited. Preferably, the resistance value is selected, with reference to the voltage and internal resistance of source 1, such that the current through regulator means 4 is within the constant voltage characteristic of means 4 throughout the range of normal voltage changes expected from source 1. The output voltage of the source of electric voltage 1 is larger than the constant voltage of regulator means 4 and the difference in potential appears across resistor 3.

A voltage magnitude sensor device, as unijunction transistor (UJT) 11, is connected to the constant voltage regulator means 4 and energized therefrom. When the sensor device is a unijunction transistor, as shown, the base-one 12 thereof is connected by an impedance 13 to the negative terminal of regulator 4 and base-two 14 thereof is connected by condutive means to the positive terminal of regulator 4. In FIGURE 1, the latter conductive means takes the form of a diode having its anode connected to the positive terminal of regular 4 and a resistor 16 having one terminal thereof connected to the cathode of diode 15 and the other terminal thereof connected to base-two 14. When impedance 13 is a resistor, as illustrated, output means for the sensor advantageously takes the form of a capacitor 17 connected to base-one 12 and to an output terminal 18. Emitter 19 of UJT 11 is connected by capacitive means, as capacitor 20 to the positive terminal of regulator 4.

Operation of the circuit thus far described is as follows. UJT 11 possesses an intrinsic standoff ratio equal to about one half and normally falling within the range from 0.47 to 0.62. The significance of the standoff ratio is that when the positive voltage at input terminal 21 of UJT 11 is less than a predetermined fraction of the inter-base voltage of UJT 11, the internal resistance (within the UJT semiconductive material) between emitter 19 and base-one 12 is high and when the voltage excursion at terminal 21 exceeds the predetermined fraction of the inter-base voltage, UJT 11 switches to provide a low internal resistance between emitter 19 and base-one 12. The predetermined fraction is essentially equal to the intrinsic standoff ratio of the particular device. The threshold voltage above which the UJT switches is equal to the intrinsic standoff ratio multiplied by the inter-base voltage, or potential difference between base-two 14 and base-one 12.

Preferably, the resistance values of resistors 13 and 16 are much less than the inter-base resistance and the inter-base voltage is substantially equal to the constant output voltage of regulator means 4. Thus, when the voltage of terminal 21 raises above a predetermined fraction, substantially equal to one half, of the voltage of regulator means 4, capacitor 20 discharges through resistor 13 providing a sharp positive pulse at terminal 18. It will be apparent that impedance means 13 could equally well be the primary of a transformer and terminal 18 could be connected to the secondary of such transformer.

The sensor input terminals 22 and 23 are conveniently shunted by a tapped resistor 24 having the variable tap 25 thereof connected to UJT 11 input terminal 21. In this way, the magnitude of sensor input voltage that triggers an output response from UJT 11 is readily varied by changing the position of tap 25 on variable resistor 24. Sensor terminal 23 is additionally connected to the negative terminal of regulator means 4 and is denominated ground, or point of zero reference potential, for the circuit.

The difficulty experienced with circuits as thus far described is that when a power supply failure occurs the voltage of regulator means 4 eventually declines. Consequently, the potential difference between the two bases of UJT 11 is reduced and the magnitude of a predetermined fraction of the inter-base voltage similarly decreases. In this way, the input voltage required to trigger an output pulse at terminal 18 becomes smaller and smaller until firing occurs, at which time an erroneous output pulse is provided.

In accord with the present invention protective means are provided that anticipates the undesirable effect of a power supply failure upon the sensor and automatically desensitizes the circuit to prevent an erroneous output signal. In the embodiment of my invention shown in FIGURE 1 the protective means includes NPN transistor 26 having the collector 27 thereof connected to UJT input terminal 21 and the emitter 28 thereof connected to the negative terminal of the regulator means 4. Base 29 of transistor 26 is connected to emitter 28 thereof by a resistor 30 that ensures that transistor 26 remains nonconductive during normal operation of the sensor. In this way, transistor 26 serves as electronic means having the primary electrodes (collector and emitter) shunting the input of the sensor and possessing a control electrode (base 29) that is responsive to a predetermined signal to establish a highly conductive path between the afore-mentioned primary electrodes. Such a predetermined signal is supplied by a path including capacitor 31 that connects base 29 with the junction between resistive impedance means 3 and source 1.

In normal operation, the sensor of FIGURE 1 performs as though no transistor 26 were in the circuit. However, when switch 6 is opened, the current in the series loop circuit consisting of source 1, resistive impedance means 3 and constant voltage regulator means 4, decreases. It will be recalled that the usual characteristic of regulator means 4 is that the voltage thereacross does not immediately decline although the current therethrough is reduced. Thus, the sharp decline in voltage is all absorbed initially by the decline in voltage across resistive impedance means 3. Because the junction of resistive impedance means 3 and regulator means 4 was formerly at a negative potential with respect to base 29, the transient voltage appears as a positive pulse supplied to base 29 through capacitor 31. This positive pulse renders transistor 26 highly conductive, discharging capacitor 20 therethrough and additionally short circuiting the input of the sensor so that no erroneous output signal is emitted from terminal 18. The protection is accomplished prior to the time when the power supply failure is reflected as a change in voltage across regulator means 4.

Additional protection for the sensor is desirable in some cases and includes a capacitor 32 connected from the junction of diode 15 and resistor 16 to the negative terminal of regulator means 4. Capacitor 32 sustains the potential difference between the two bases of UJT 11 for a time, after power supply failure, that depends upon the time required for capacitor 32 to discharge through resistor 16, and the circuit including the two bases of UJT 11, and resistor 13. Diode 15 is forward-biased during normal circuit operation and provides a charging path for resistor 32, but it quickly isolates the base circuit of UJT 11 from the power supply when the voltage across regulator means 4 drops to a value less than the voltage accumulated by capacitor 32. When capacitor 32 is omitted from the circuit, diode 15 can also be omitted therefrom and replaced by a conductor.

While the sensor circuit of FIGURE 1 offers simplicity of design and economy of components, in some applications it is desired that the negative terminal of the source of electric voltage be at ground, or zero reference potential, for the entire system including the sensor. In such event, the embodiment of my invention illustrated in FIGURE 2 is advantageously used.

The basic sensor circuit of FIGURE 2 is in many ways similar to that of FIGURE 1 and only the differences will be noted herein. Similar components of the two figures are similarly numbered.

The sensor circuit of FIGURE 2 features resistive impedance means 40 connecting the respective positive terminals of regulator means 4 and source 1, to form the series loop network. It will be recalled that in FIGURE 1 the resistive impedance means was connected between the negative terminals of regulator means 4 and source 1. The present connection permits continuation of the negative terminal of source 1 as the ground for the sensor.

In the circuit of FIGURE 2, capacitor 41 couples a negative control pulse to a controllable device from the junction between resistive means 40 and source 1. Such a pulse would be ineffective to render an NPN transistor conductive and other electronic means are required to effect protection of the sensor circuit and prevent an erroneous output signal from terminal 18. To this end, an electronic device having primary electrodes connected across the sensor input means and having a control electrode rendering the device highly conductive between the primary electrodes in response to a negative control signal is required. One such device is triac 42 illustrated in FIGURE 2 and available under the designation ZJ257B, for example.

The triac is a bi-directional semiconductor triode device having characteristics not entirely unlike the silicon controlled rectifier (SCR) but has two primary electrodes and a control electrode that is effective to establish a path of high conductivity between the primary electrodes in response to a trigger pulse of either polarity. The triac can be rendered conductive in either direction, by a control pulse of either polarity, unlike the conventional SCR that is an asymmetrically conductive device.

Thus, triac 42 is connected with one primary electrode 43 connected to terminal 21 and the other primary electrode 44 connected to the negative terminal of regulator means 4. Control electrode 45 of triac 42 is connected to one plate of coupling capacitor 41.

Operation of the circuit of FIGURE 2 is substantially the same as operation of the circuit of FIGURE 1 except that a negative pulse causes conduction of the protective electronic device upon failure of the power supply and, once the electronic device has commenced conduction, it continues to conduct until essentially all of the charge on capacitor 20 is removed.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A voltage sensor circuit comprising:
   (a) a source of electric voltage subject to failure;
   (b) a constant voltage regulator that maintains a substantially constant output voltage which is less in magnitude than the normal voltage of said source over a range of current magnitude through the regulator;
   (c) resistive impedance means connected in series loop circuit relationship with said source and said regulator and having a resistance value that establishes a current in said range through said regulator during normal operation of the voltage sensor circuit;
   (d) a voltage magnitude sensor, having input and output means, connected to and energized from the constant voltage regulator and responsive to an input signal to said input means exceeding a predetermined fraction of the constant output voltage to provide a signal at said output means;
   (e) an electronic device, including first and second primary electrodes and a control electrode, responsive to a predetermined signal supplied to said control electrode to establish a highly conductive path between said primary electrodes;
   (f) conductive means connecting said primary electrodes in parallel circuit relationship with the input means of said sensor; and,
   (g) means coupling said control electrode to the junction of said resistive impedance means and said source, and providing said predetermined signal to said control electrode in response to a rapid substantial drop in the voltage of said source prior to a change in the voltage of said regulator, whereby said sensor is disabled in anticipation of a failure of said source and an erroneous output signal is prevented.

2. The circuit of claim 1 wherein said source and said regulator each have positive terminals and said resistive impedance means is connected from one of said positive terminals to the other of said positive terminals.

3. An overvoltage alarm circuit comprising:
   (a) a first semiconductor device including first, second and third electrodes, said first and second electrodes being adapted to be connected to respective terminals of a source of predetermined voltage, said third electrode being adapted to be connected to a source of voltage to be sensed, the internal impedance between said third and first electrodes having a first magnitude when the voltage of said third electrode is less than a given fraction of said predetermined voltage and said internal impedance switching to a second magnitude that is substantially less than said first magnitude when the voltage of said third electrode is greater than said given fraction of said predetermined voltage, and output means coupled to said first electrode;
   (b) a second semiconductor device, including first and second primary electrodes and a control electrode, responsive to a predetermined signal applied to said control electrode to establish a highly conductive path between said primary electrodes; and,
   (c) means connecting said first and second primary electrodes to said third and first electrodes, respectively, of said first semiconductor device, and means coupling said control electrode to said source of predetermined voltage and supplying said predetermined signal to said control electrode when said source is de-energized, whereby no output signal is caused by a failure of said source.

4. An overvoltage alarm circuit comprising:
   (a) a unijunction transistor having first and second base electrodes and a trigger electrode;
   (b) a constant voltage regulator device having positive and negative terminals, said positive terminal being adapted to be connected to a corresponding terminal of a source of electric power;
   (c) resistive impedance means connected to said negative terminal and having an input terminal adapted to resistively connect said negative terminal to a corresponding terminal of said source;
   (d) an impedance connecting said first base electrode to said negative terminal;
   (e) means connecting said second base electrode to said positive terminal;
   (f) capacitive means connecting said trigger electrode to said second base;
   (g) input means connected to said trigger electrode and adapted to be connected to a source of voltage to be sensed;
   (h) output means coupled to said first base electrode; and, (i) an NPN transistor having a collector, a base and an emitter, said collector being connected to said trigger electrode, said emitter being connected to said negative terminal, and the base electrode of said transistor being coupled to the input terminal of said resistive impedance means, so that said trigger electrode is rapidly disabled in response to deenergization of said source of electric power, whereby an erroneous output signal is prevented.

5. The circuit of claim 4 wherein said means connecting said second base electrode to said positive terminal consists of a diode having an anode and a cathode and a resistor, said anode being connected to said positive terminal, said cathode being connected to said second base by said resistor; and a capacitor is connected from said cathode to said negative terminal.

References Cited by the Examiner
UNITED STATES PATENTS

| | | | |
|---|---|---|---|
| 3,060,388 | 10/1962 | Ball | 332—9 |
| 3,112,412 | 11/1963 | Oyer | 307—88.5 |
| 3,193,709 | 7/1965 | Baxter | 307—100 |
| 3,201,776 | 8/1965 | Murrow | 340—261 |

ORIS L. RADER, *Primary Examiner.*

T. J. MADDEN, *Assistant Examiner.*